2,996,476
CROSS-LINKED POLYMERIC MATERIAL AND METHOD OF MAKING THE SAME

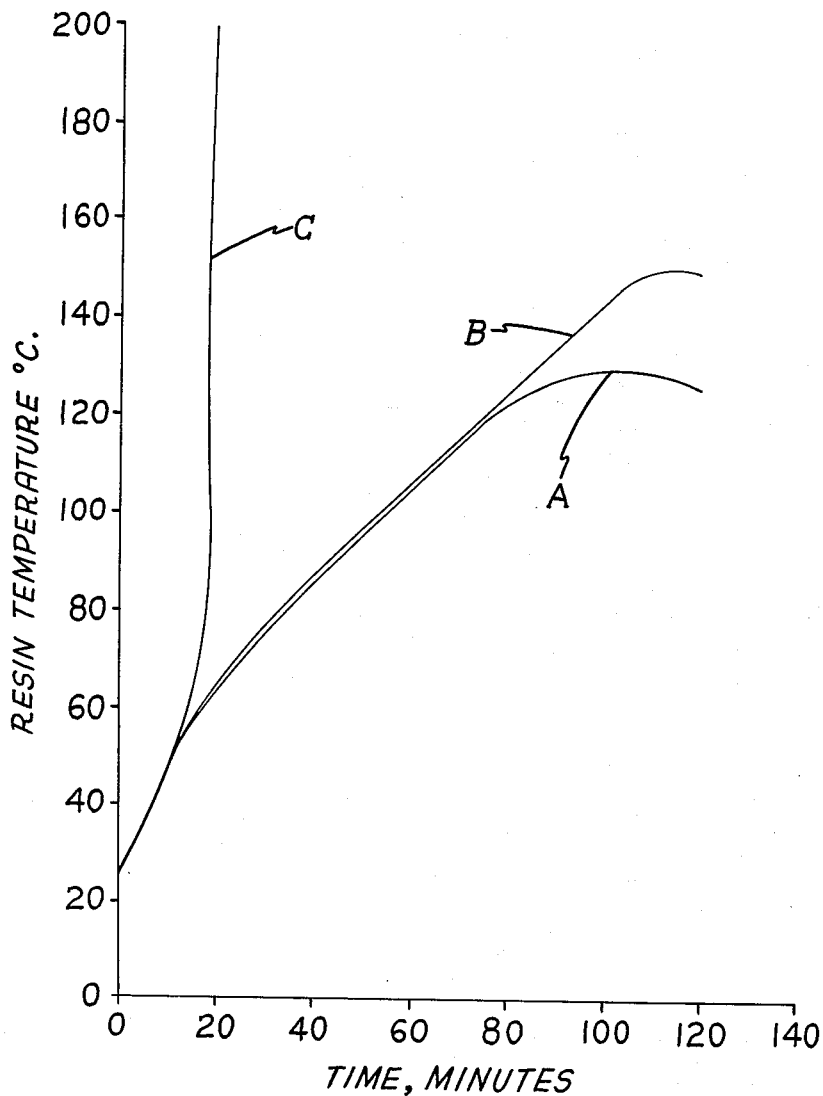

Paul W. Juneau, Jr., Pittsfield, Mass., assignor to General Electric Company, a corporation of New York
Filed Jan. 30, 1958, Ser. No. 712,262
2 Claims. (Cl. 260—45.4)

The present invention relates to synthetic polymeric materials and to a method of making the same. More particularly, the invention relates to the polymerization of unsaturated polyesters using a cross-linking reactant which provides an improved polymerizing process.

In curing unsaturated polyesters it is conventional in the art to employ as catalysts any of a variety of inorganic and organic peroxides, as, for example, sodium peroxide, barium peroxide, benzoyl peroxide, acetyl peroxide, and the like. In making relatively large, bulky products of polyester composition, however, as in casting polyester resins for encapsulating electrical devices or in making bushing insulators for electrical apparatus, such catalysts have not proved satisfactory. Due to their high catalytic reactivity, the polymerization process is excessively rapid and produces relatively violent exothermic reactions. As a result, the pot life of such catalyzed mixtures is too short, and due to the excessive heat emitted in the reaction, the cured casting is susceptible to thermally induced strains and as a result has inadequate mechanical strength.

It is an object of the invention to provide improved polyester products and a method of making the same which avoids the above-mentioned disadvantages.

It is another object of the invention to provide a cross-linking reactant for polymerizing unsaturated polyester resin materials which prolongs the pot life of the polymerizable mixture and produces relatively mild exothermic polymerization reactions.

With the above objects in view, the invention relates to a polymerizable mixture which comprises an unsaturated polyester produced by the reaction of a polyhydric alcohol and a polycarboxylic acid, and a cross-linking reactant for initiating the polymerization of the polyester, the cross-linking reactant being composed of a substituted thiuram disulfide. Specifically, the preferred cross-linking reactants in accordance with the invention are tetramethyl thiuram disulfide and tetraethyl thiuram disulfide.

The invention will be better understood from the following description taken in conjunction with the accompanying drawing, in which:

The single figure graphically illustrates the advantages of the polymerizable mixture of the present invention as compared to a prior art composition.

The expression "unsaturated polyester resins" as used herein is intended to denote synthetic resins produced by polymerization of polycarboxylic acids with polyhydric alcohols, either or both the acids and alcohols being ethylenically unsaturated, and with or without co-polymerization of an admixed vinyl monomer.

Examples of such polyhydric alcohols are ethylene glycol, di- and triethylene glycols, propylene glycol, trimethylene glycol, tetramethylene glycol, pentamethylene glycol, glycerine or pentaerythritol in combination with a monohydric alcohol. Examples of unsaturated polycarboxylic acids are maleic, fumaric, and itaconic acids. Anhydrides of polycarboxylic acids may also be employed. The term "polycarboxylic acid" as used herein is intended to include within its meaning the anhydrides of such acids. In addition to one or more of the unsaturated polycarboxylic acids, saturated polycarboxylic acids may also be present in the reaction mixture in the preparation of the resins referred to above. Examples of such saturated polycarboxylic acids are succinic, adipic, sebacic, and phthalic acids.

Of the vinyl monomers which may be used to form the polyester resin, styrene is particularly representative. Examples of other vinyl monomers which may be used include esters of unsaturated monohydric alcohols and carboxylic acids, including unsaturated carboxylic acids, halogenated aromatic carboxylic acids and inorganic acids. Examples of such substances are diallyl phthalate, diallyl succinate, diallylmaleate, diallyl fumarate, diallyl itaconate, diallyl chlorophthalates, triallyl phosphate, and vinyl acetate. Other substances which may be incorporated in these polymerizable liquids are esters of monohydric alcohols and unsaturated carboxylic acids which are capable of copolymerizing with unsaturated alkyd resins, such as, for example, dioctyl itaconate, dibenzyl itaconate, diethyl fumarate, dibenzyl fumarate, methyl acrylate and methyl methacrylate.

It has been found in accordance with the invention that ethylenically unsaturated polyesters of the above type can be effectively cured by reaction with tetramethyl thiuram disulfide as a cross-linking reactant, and that by virtue of this cross-linking agent the pot life of the catalyzed polyester material is substantially prolonged. It has further been discovered that the exothermic polymerizing reaction produced by the tetramethyl thiuram disulfide is relatively mild as compared to the prior types of catalyzed polyester mixtures, and avoids the difficulties attendant on the use of conventional curing agents which produce excessively high temperatures in the cross-linking reaction.

A related composition, tetraethyl thiuram disulfide, has also been found to provide beneficial results in the above respects in polymerizing polyester mixtures, although to a somewhat lesser degree than tetramethyl thiuram disulfide.

Gel time tests were made to compare the reactivity of tetramethyl thiuram disulfide and tetraethyl thiuram disulfide with that of benzoyl peroxide, a conventional type of polyester catalyst. The results of these tests are set forth in the table below. In these tests .5% of each catalyst by weight of the polyester resin was used, and the reaction was carried out in an oven at 100° C. The Selectron and Laminac polyesters shown in the table are commercial types of styrene-modified unsaturated alkyd resins made by reacting phthalic acid and maleic acid of different proportions with propylene glycol, and the resin A material is composed of 30% styrene and 70% polyester of dipropylene glycol maleate stoppered with 4% tetrahydrofurfurylalcohol.

TABLE I

| Polyester resin | Polymerizing Agent Gel Time, Minutes | | |
| --- | --- | --- | --- |
| | Benzoyl Peroxide | Tetraethyl thiuram disulfide | Tetramethyl thiuram disulfide |
| Selectron 5003 | 2.7 | 7.24 | 12.52 |
| Resin A | 3.0 | 11.10 | 17.0 |
| Laminac 4128 | 2.14 | 8.01 | 8.78 |

It is evident from the results shown in the table above that the reactivity of benzoyl peroxide with unsaturated polyesters is much more rapid than either tetramethyl thiuram disulfide or tetraethyl thiuram disulfide, and that tetramethyl thiuram disulfide provides the least reactivity of the three catalysts tested.

The figure in the drawing graphically illustrates the differences between the cross-linking reactants of the present invention and a benzoyl peroxide catalyst in the polymerizing reactions produced by the different reactants. In the graph, the time in minutes is plotted against the reaction temperature in degrees centigrade. Curve A represents a mixture of a styrene-modified polyester of the composition set forth in Example I below and .5% by weight of tetramethyl thiuram disulfide based on the weight of the resin. Curve B represents a mixture of the same polyester resin with .5% of tetraethyl thiuram disulfide. Curve C represents a mixture of the same polyester resin with .5% by weight of benzoyl peroxide. It is apparent from the graph that the temperature of the benzoyl peroxide catalyzed mixture rises steeply upon initiation of the reaction to a level of over 200° C. in less than 20 minutes. On the other hand, the mixtures containing tetramethyl thiuram disulfide and tetraethyl thiuram disulfide show relatively gradual rises in temperature, their curves leveling off at a point considerably below the maximum temperature of curve C. In the case of tetraethyl thiuram disulfide, a peak temperature of about 152° C. is reached after about 110 minutes, and in the case of tetramethyl thiuram disulfide a gradual rise occurs to a maximum temperature of about 130° C. in about 90 to 100 minutes.

In general, the thiuram disulfide reactants of the invention are preferably added to the polymerizable resin mixture in the range of about .25 to 2% by weight of the polyester resin. Amounts of the cross-linking reactant below this range result in excessively slow curing, while amounts higher than 2% do not appear to provide appreciable improvement in the rate of polymerization. However, proportions of the cross-linking reactants above 2% do not appear to cause excessive exothermic reaction.

The cross-linking reactants may be incorporated in the unsaturated polyester mixture in any suitable manner, such as by manual mixing, rolling, or by other types of agitation, with or without heating. Preferably, the heat applied for mixing should not exceed about 50–60° C.

The mixture of resin and cross-linking reactant may have incorporated therein, prior to heating, filler materials of various types, as, for example, ground silica, hydrated alumina, ground talc, and the like, for purposes of imparting increased mechanical strength, reducing the cost of the final product, or for other reasons.

In this connection, the cross-linking reactants of the invention provide a significant advantage in that greater proportions of filler material can be used than heretofore found feasible, due to the useable pot life of the mixture at the relatively low temperature of 70° to 100° C., and the resulting decrease in viscosity which can be achieved merely by heating the mixture.

Castings made of the polymerized mixtures of the invention have exhibited electrical characteristics equivalent to those produced by the usual peroxide catalysts, and the strain-free, modified polyester products of the invention in addition provide marked improvement in mechanical strength and an ease of manufacture which makes them superior to the prior types of polyester castings and processes for making them.

The following examples illustrate the manner of practicing the invention, it being understood that the invention is not intended to be limited thereby:

*Example I*

One gram of tetramethyl thiuram disulfide was incorporated by rolling into a styrene-modified polyester resin consisting of a mixture of 60 grams styrene and 140 grams of a polyester produced by the reaction of 1.1 mol phthalic acid, and 1.0 mol maleic acid with an equivalent amount of propylene glycol. The resulting catalyzed resin mixture had a gel time of 12–13 minutes at 100° C. The peak exothermic temperature attained by a sample of this resin in a 100° oven was 131° C. Upon curing a sample of this resin at 100° C. for 16 hours, a hardened cross-linked thermoset resin was obtained. The electrical properties of this resin product were as follows:

|  | 25° C. | 100° C. |
| --- | --- | --- |
| Power Factor, percent | 0.438 | 7.288 |
| Dielectric Constant | 3.46 | 4.61 |
| Resistivity, ohms/cm | $1,810.4 \times 10^{12}$ | $39.31 \times 10^{12}$ |

These electrical properties are comparable to those characterizing resins produced with the usual peroxide catalysts and make the described resin eminently suitable as electrical insulation material.

*Example II*

One gram of tetramethyl thiuram disulfide was incorporated by mixing in a styrene-modified polyester resin composed of a mixture of 60 grams styrene and 140 grams of a polyester made by the reaction of 0.6 mol phthalic acid and 1.0 mol maleic acid with an equivalent amount of propylene glycol. The resulting catalyzed mixture had a gel time of 8–9 minutes at 100° C., and the maximum exothermic temperature reached by a sample of this resin in a 100° oven was about 185° C.

*Example III*

One gram of tetraethyl thiuram disulfide was mixed with a styrene-modified polyester resin of the composition set forth in Example I. The gel time of the mixture thus catalyzed was about 7–8 minutes at 100° C. and the peak exothermic temperature attained by this resin in a 100° oven was 152° C. Curing of a sample of this resin at 100° C. for 16 hours produced a hardened cross-linked thermoset resin which was similar to that produced by the material of Example I.

*Example IV*

One gram of tetraethyl thiuram disulfide was incorporated by rolling in a styrene-modified polyester resin of the composition described in Example II, and the resulting polymerizable resin mixture was found to have a gel period of 8–9 minutes at 100° C. Curing of this resin mixture at 100° C. for 16 hours produced a thermoset cross-linked resin product similar to those of the preceding examples.

*Example V*

A polyester resin produced by the reaction of hexachloroendomethylene tetrahydrophthalic anhydride, maleic anhydride and a glycol and modified by the addition of styrene in the ratio of 140 grams of polyester resin to 60 grams of styrene had incorporated therein one gram of tetramethyl thiuram disulfide. The thus catalyzed mixture was found to have a gel time of about 8½ minutes and resulted after curing in a hard thermoset resin product.

*Example VI*

A resin mixture of the composition set forth in Example V was made with tetraethyl thiuram disulfide substituted for tetramethyl thiuram disulfide. A similar thermoset resin was produced on curing, the gel time of this mixture being about 6 minutes.

It will be readily apparent that the resin products and mixtures of this invention may be modified by the addition of plasticizers, stabilizers, pigments and extenders, if desired, without going beyond the scope of the invention.

While the present invention has been described with reference to particular embodiments thereof, it will be understood that numerous modifications may be made by those skilled in the art without actually departing from the scope of the invention. Therefore, the appended claims are intended to cover all such equivalent variations as come within the true spirit and scope of the invention.

What I claim as new and desire to secure by Letters Patent of the United States is:

1. A hard thermoset cross-linked unsaturated polyester resin composed of the reaction product of (1) a resinous polyester of an ethylenically unsaturated polycarboxylic acid and a saturated glycol, said polyester being modified with a vinyl monomer, and (2) a cross-linking reactant therefor selected from the group consisting of tetramethyl thiuram disulfide and tetraethyl thiuram disulfide, said cross-linking reactant being the sole curing agent for said polyester and being present in the amount of about .25 to 2% by weight of the polyester resin.

2. The process of making a hard thermoset unsaturated polyester resin which comprises curing a resinous polyester of an ethylenically unsaturated polycarboxylic acid and a saturated glycol and modified with a vinyl monomer, with a cross-linking reactant selected from the group consisting of tetramethyl thiuram disulfide and tetraethyl thiuram disulfide as the sole curing agent therefor, said cross-linking reactant being present in the amount of about .25 to 2% by weight of the polyester resin.

References Cited in the file of this patent

UNITED STATES PATENTS

| | | |
|---|---|---|
| 2,373,015 | Cowan et al. | Apr. 3, 1945 |
| 2,384,443 | Cowan et al. | Sept. 11, 1945 |
| 2,426,994 | Frosch | Sept. 9, 1947 |
| 2,443,737 | Kropa | June 22, 1948 |
| 2,598,407 | Marvel | May 27, 1952 |
| 2,673,151 | Gerhart | Mar. 23, 1954 |